US012208546B2

United States Patent
Nohl et al.

(10) Patent No.: US 12,208,546 B2
(45) Date of Patent: Jan. 28, 2025

(54) MANHOLE URETHANE MOLD AND METHOD OF PRODUCING THE SAME

(71) Applicant: Oldcastle Infrastructure, Inc., Atlanta, GA (US)

(72) Inventors: Jacob Nohl, Hancock, MN (US); Alec Gausman, Hancock, MN (US); Craig Knochenmus, Hancock, MN (US)

(73) Assignee: Oldcastle Infrastructure, Inc., Atlanta, GA (US)

( * ) Notice: Subject to any disclaimer, the term of this patent is extended or adjusted under 35 U.S.C. 154(b) by 491 days.

(21) Appl. No.: 17/061,542

(22) Filed: Oct. 1, 2020

(65) Prior Publication Data

US 2022/0105663 A1 Apr. 7, 2022

Related U.S. Application Data

(60) Provisional application No. 62/909,195, filed on Oct. 1, 2019.

(51) Int. Cl.
| | | |
|---|---|---|
| *B29C 33/38* | (2006.01) | |
| *B28B 1/14* | (2006.01) | |
| *B28B 7/00* | (2006.01) | |
| *B29C 39/02* | (2006.01) | |
| *B29C 71/02* | (2006.01) | |
| *B29K 75/00* | (2006.01) | |
| *B29L 31/00* | (2006.01) | |

(52) U.S. Cl.
CPC ............ *B29C 33/3842* (2013.01); *B28B 1/14* (2013.01); *B28B 7/00* (2013.01); *B29C 39/026* (2013.01); *B29C 71/02* (2013.01); *B29K 2075/00* (2013.01); *B29L 2031/757* (2013.01)

(58) Field of Classification Search
CPC .......... B29C 33/3842; B29C 2033/385; B29C 33/3857; B29C 2033/3864; B29C 2033/3871; B29C 33/3878; B29C 33/3885; B29C 33/3892; B29C 33/14; B29C 33/16; B29C 33/18; B29C 39/26; B29L 2031/10; E02D 29/12; B28B 7/168; B28B 23/0056; E03F 5/02; E04G 13/02; E04G 21/12
USPC ........................................................ 264/219
See application file for complete search history.

(56) References Cited

U.S. PATENT DOCUMENTS

| | | | | |
|---|---|---|---|---|
| 3,542,327 A | * | 11/1970 | Herzog | ................... B28B 7/168 264/294 |
| 2011/0012287 A1 | * | 1/2011 | Toledo | ................ B29C 33/3842 264/226 |
| 2018/0087283 A1 | * | 3/2018 | Bussio | .................... F16L 1/038 |

* cited by examiner

*Primary Examiner* — Michael M. Robinson
(74) *Attorney, Agent, or Firm* — Todd R. Fronek; Larkin Hoffman Daly & Lindgren, Ltd.

(57) ABSTRACT

Process and mold embodiments are described herein for creating polyurethane molds that allow for the production of manhole bases.

2 Claims, 6 Drawing Sheets

MANHOLE URETHANE MOLD AND METHOD OF PRODUCING THE SAME

BACKGROUND

Manholes are included in some sewer lines. Some manholes are formed in molds from materials such as concrete.

DESCRIPTION

Process embodiments are described herein for creating polyurethane molds that allow for the production of manhole bases, e.g., monolithic manhole bases with distinctive channel geometries. In one embodiment, the process includes forming a first, preliminary mold, positioning a reinforcing structure with respect to the preliminary mold and forming a second, reinforced mold with the reinforcing structure positioned therein. The second mold, in one embodiment, can be formed of polyurethane with an embedded plate (e.g., formed of steel), lifting eyes and hole former connectors. In some embodiments, the first and second molds are made of another material (e.g., plastic, rubber, polymer).

In order to form a mold that allows for production of monolithic manhole bases, a first or preliminary mold is made (e.g., milled such as by using a robot or CNC machine) to a desired geometry, which can include one or more channels. In some embodiments the mold is made out of a foam block (e.g., formed of polyisocyanurate). Next, the first or "preliminary" mold is sanded and prepared for coating.

Figure 1:
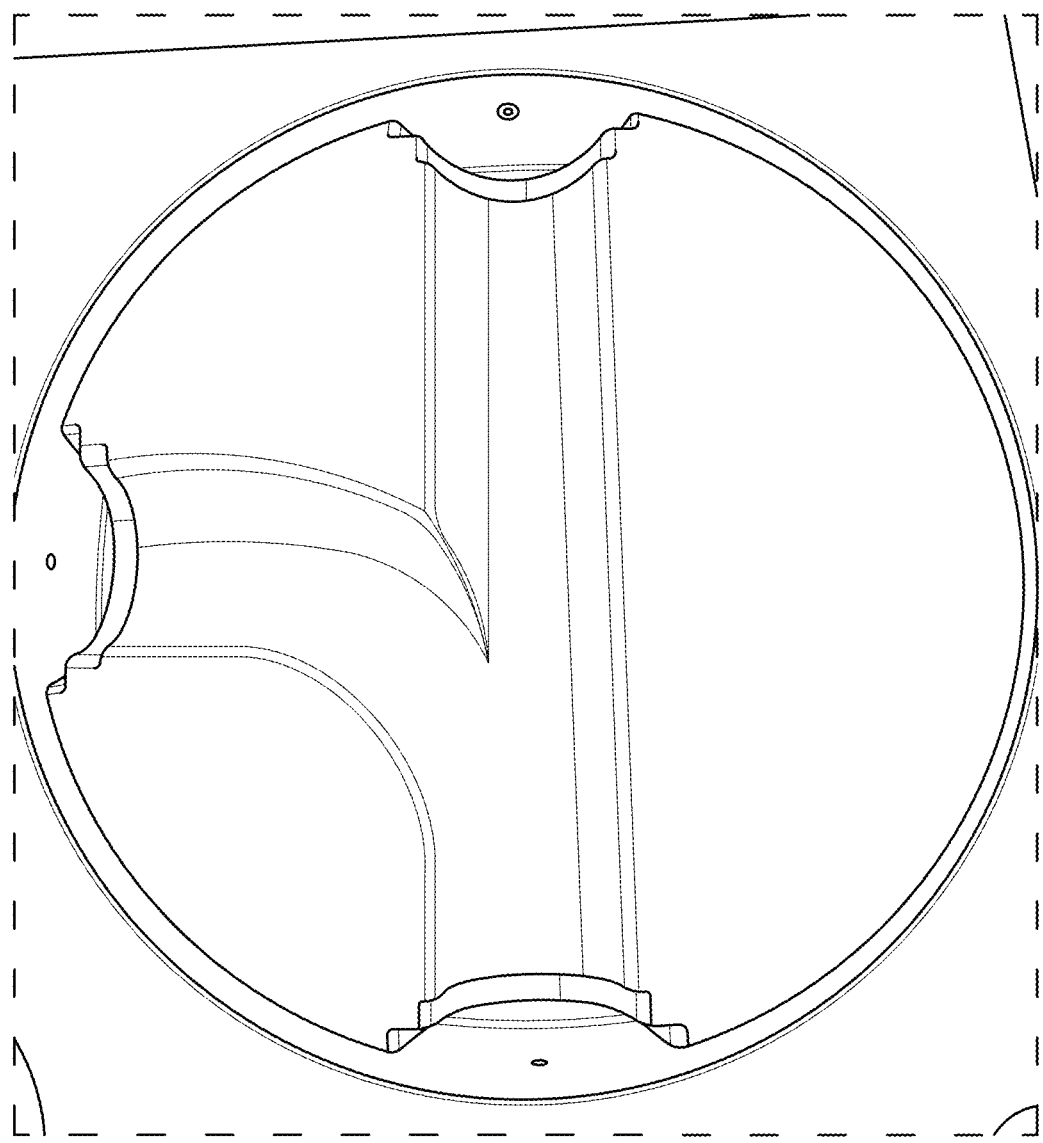
FIG. 1 is a top view of an embodiment of a preliminary mold.

The first mold is then coated (e.g., with a polyurethane coating or other coating which may be applied by spraying, rolling, brushing, etc.) to allow for the release of the polyurethane urethane. FIG. 1 shows an example first mold that has been formed with an example geometry and coated as discussed above.

A reinforcing structure that includes a steel plate (e.g., having a thickness of approximately 5/16") can be fabricated that will be embedded into the urethane that forms the second mold. Elements can be built up off of the steel plate to follow the desired geometry in order to maintain a urethane thickness of approximately 3/4" along the desired geometry. Threaded couplers can be welded to the flat plate to be used for removing a final mode from the finished concrete structures.

Figure 2:
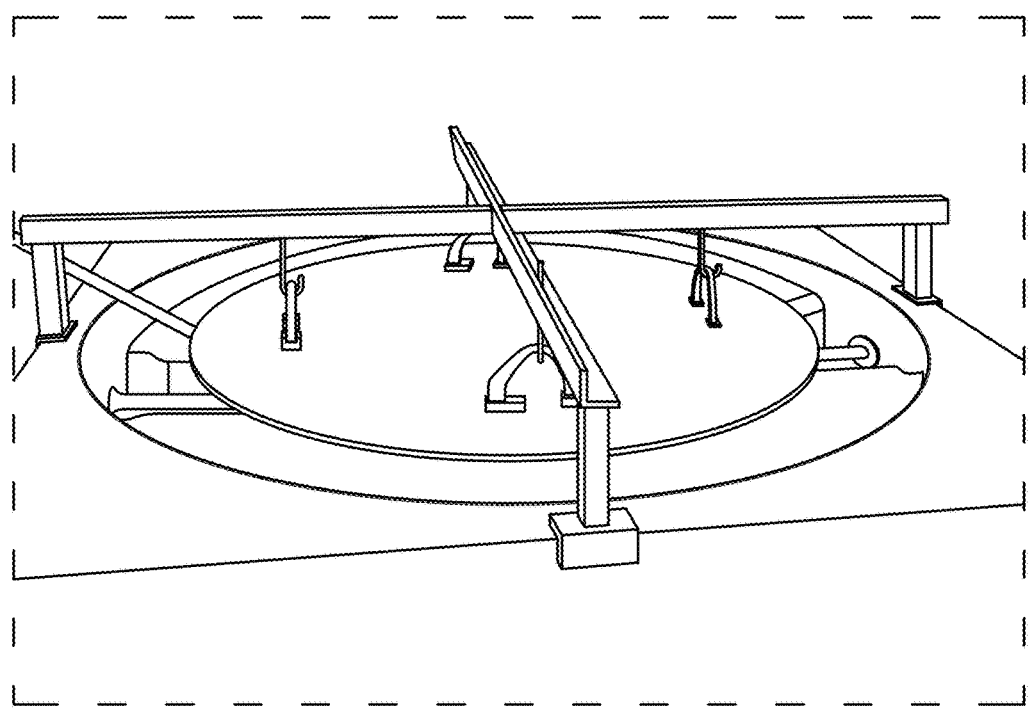
FIG. 2 is a perspective view of an embodiment of a reinforcing structure positioned in the preliminary mold of FIG. 1.
Figure 3:
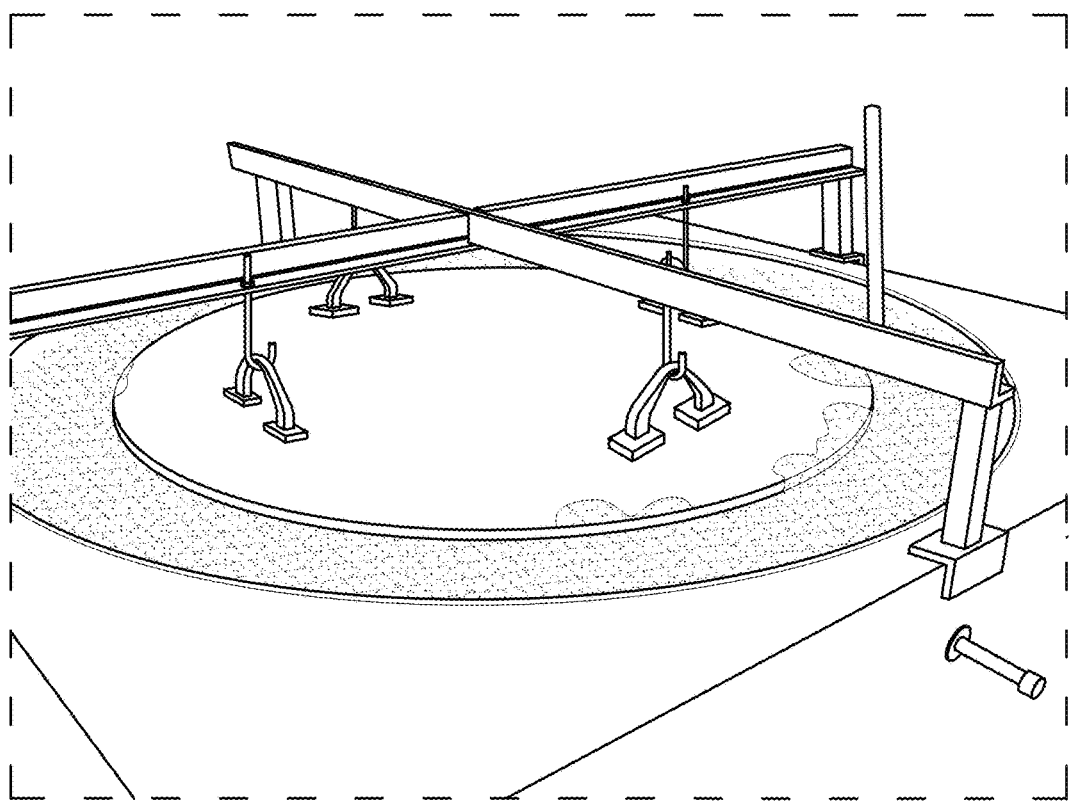
FIG. 3 illustrates the preliminary mold of FIG. 1 being filled with urethane to a first extent with the reinforcing structure of FIG. 2 positioned therein.
Figure 4:
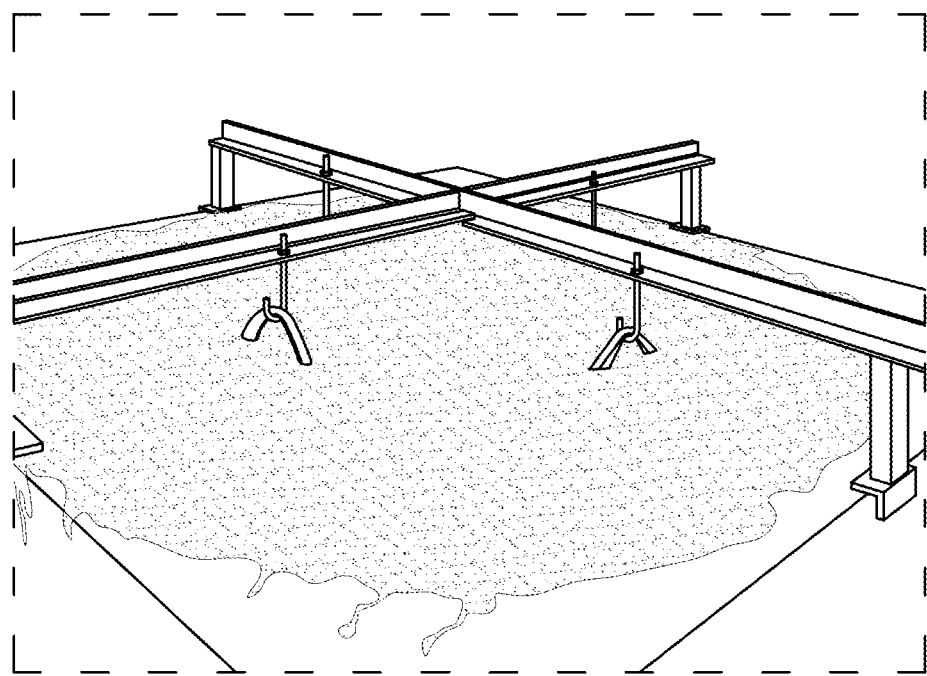
FIG. 4 illustrates the preliminary mold of FIG. 1 being filled with urethane to a second extent with the reinforcing structure of FIG. 2 positioned therein.

As shown in FIG. 2, the steel plate can be leveled within the first mold such that, when urethane is poured into the first mold, as shown in FIGS. 3 and 4, connections are embedded in the second mold for hole former installation.

Figure 5:
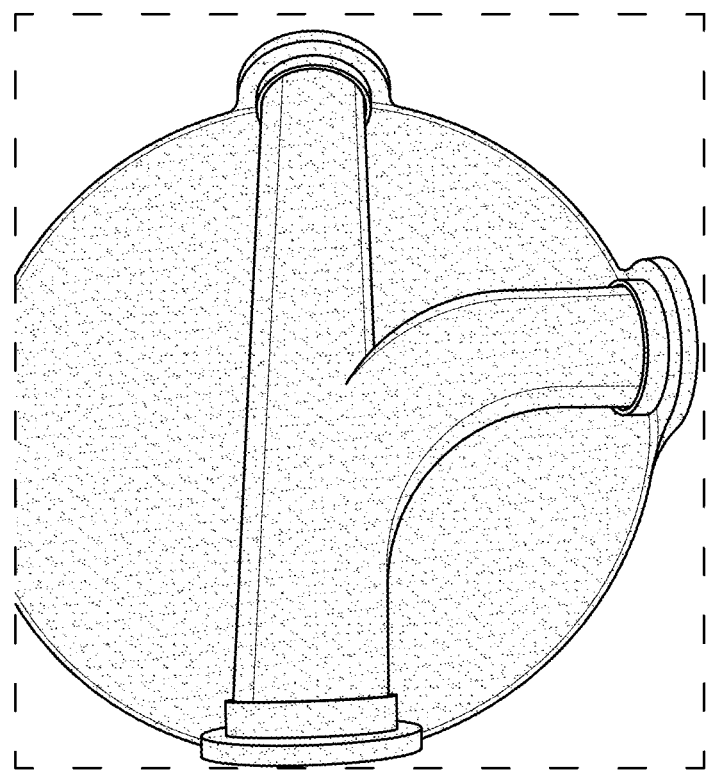
FIG. 5 is a top view of an embodiment of a manhole mold produced removed from a preliminary mold.

The finished polyurethane mold is removed from the preliminary mold. The final mold can then be cured as shown in FIG. 5. The second mold includes the steel plate and lifting eye embedded into urethane. Connections for hole formers are also optionally present.

A concrete manhole base can then be formed using the second mold, for example by placing the second mold within another structure and pouring concrete into the structure with the second mold in place. In some embodiments, hole formers are attached to the embedded connection described above before pouring the concrete.

Figure 6:
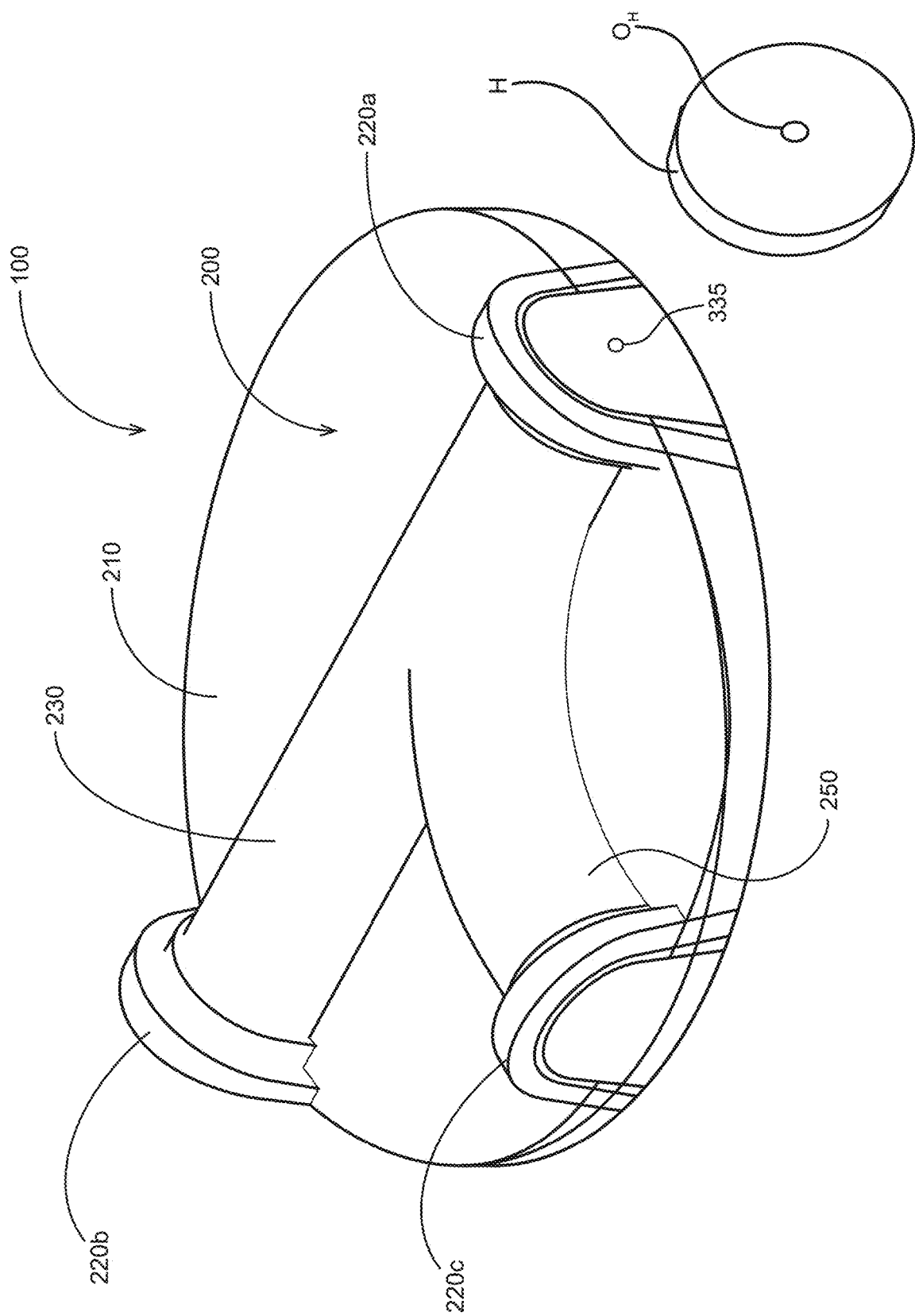
FIG. 6 is a perspective view of an embodiment of a manhole mold.
Figure 7:
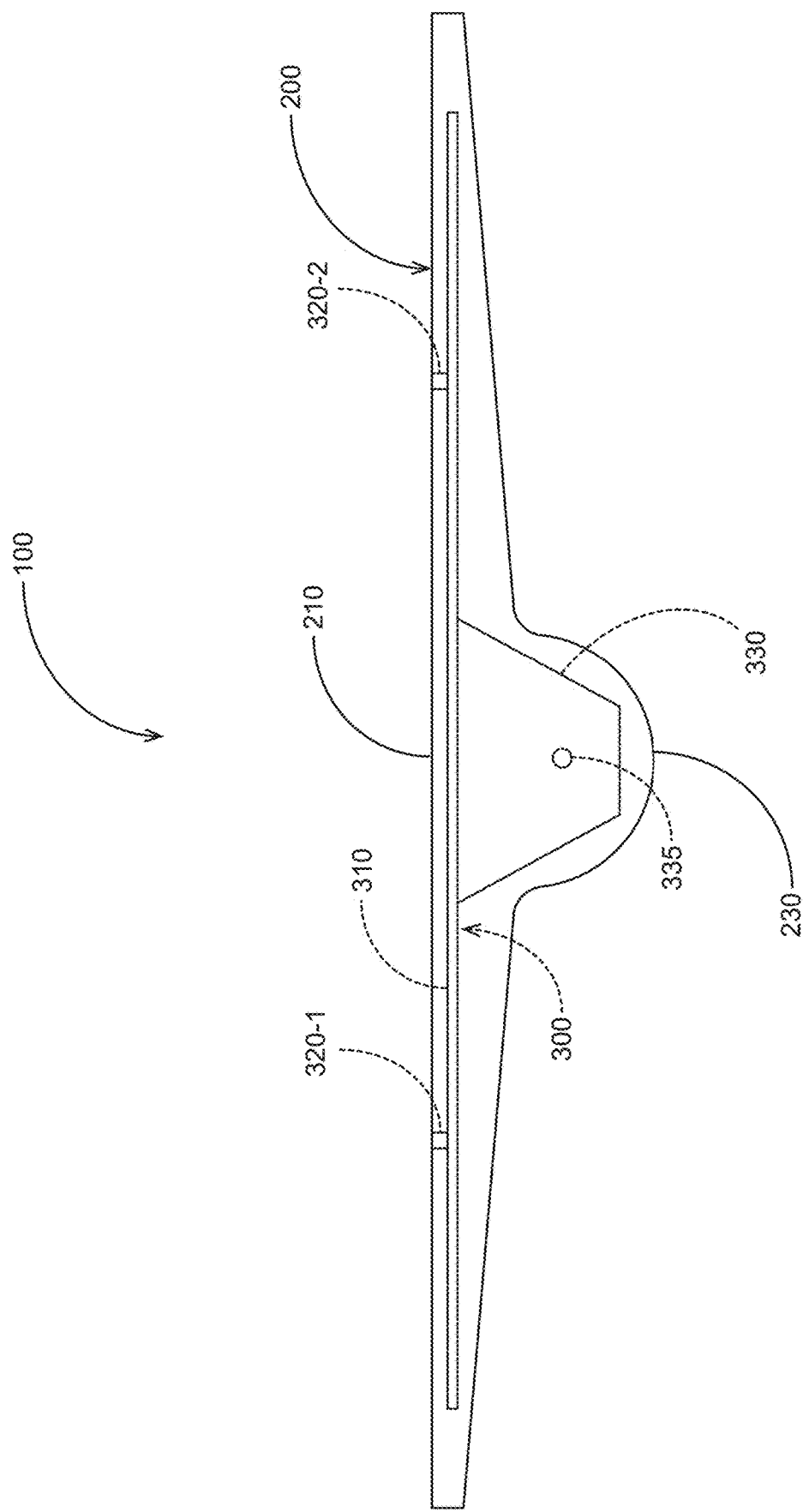
FIG. 7 is a cross-sectional view of the manhole mold of FIG. 6.

Turning to FIGS. 6 and 7, an embodiment of a manhole mold 100 is illustrated in more detail. The mold 100 optionally includes a urethane body 200 and a reinforcing structure 300. The urethane body 200 optionally includes a generally disc-shaped portion 210. The urethane body 200 optionally includes a semi-cylindrical channel 230 extending from one side of the body 200 to an opposing side thereof. The urethane body 200 optionally includes a channel 250 extending arcuately from the channel 230 to another side of the body 200. The urethane body 200 optionally includes flanges 220 at outer ends of the channels 230, 250. Referring to FIG. 7, the reinforcing structure 300 optionally includes a plate 310 (e.g., metal plate, steel plate, circular plate, circular steel plate, circular metal plate, reinforcing disc, etc.). The plate 310 optionally has one or more lifting attachments (e.g., lifting eyes, embedded lifting eyes, embedded lifting eyes having attachment screw threads, etc.) mounted thereto and extending to an upper end of the urethane body 200. The plate 310 optionally has one or more hole mount supports 330 extending downward therefrom at least partially into each end of the channel 230 and/or the channel 250. In some embodiments the mount supports 330 additionally or alternatively extend at least partially into the flanges 220. The mount supports 330 optionally support one or more hole former connections 335 (e.g., threaded connection, etc.) for attaching one or more hole formers H (e.g., by extending a bolt or other fastener through an opening $O_H$ in the hole former H and attaching the fastener to the connection 335). The hole formers H may be made of rubber, urethane, metal or other material.

Figure 8:
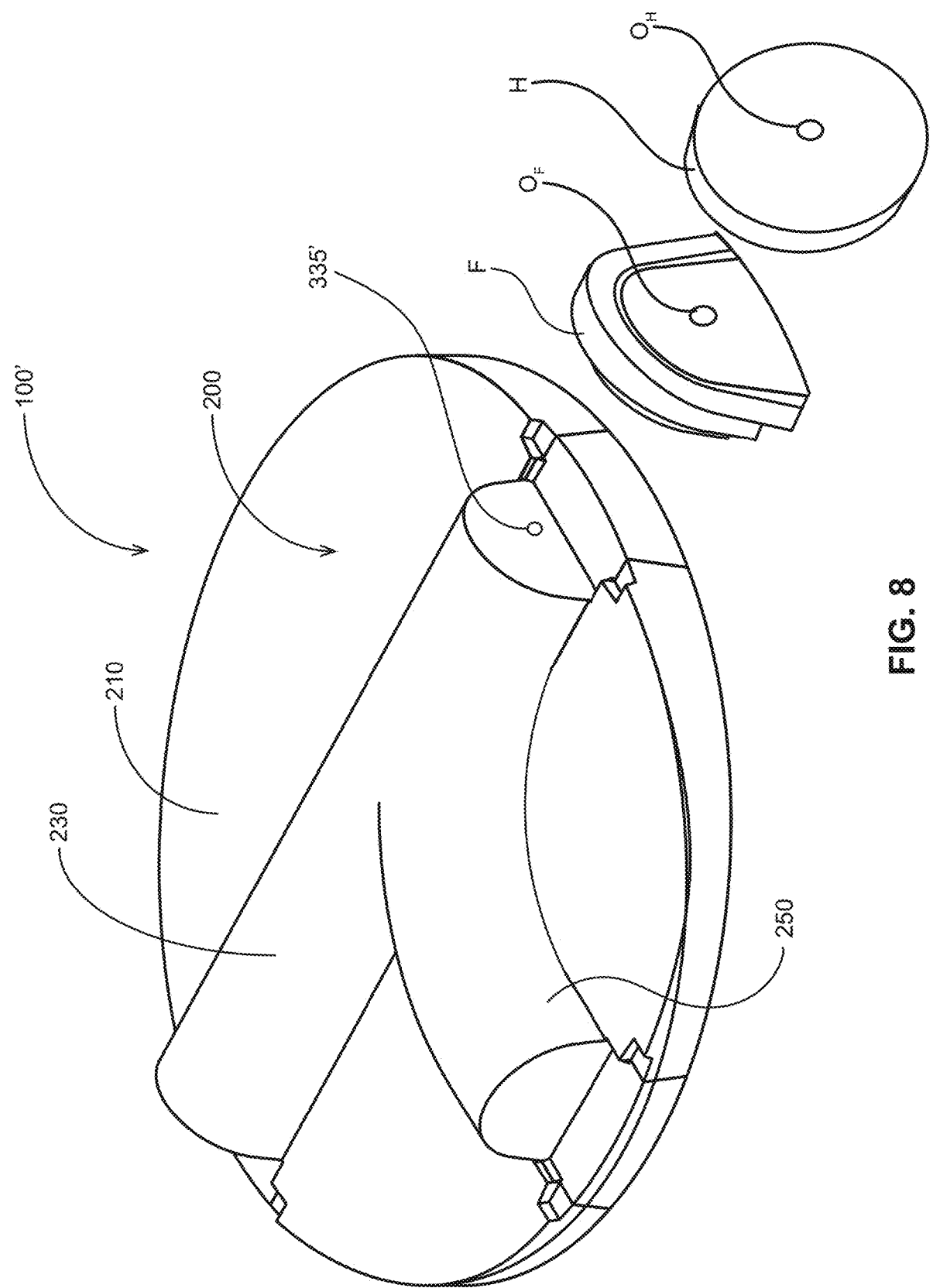
FIG. 8 is a perspective view of an alternative embodiment of a manhole mold.

Referring to FIG. 8, an alternative embodiment of a manhole mold 100' is illustrated without flanges 220. A modified reinforcing structure of manhole mold 100 optionally includes a connection 335' for attaching a removable flange F which may be made of urethane, rubber, metal or other material and may include one or more embedded reinforcing structures (e.g., metal plates, etc.). Hole former H and flange F may be attached to connection 335' by extending a bolt or other fastener through opening $O_H$ in the hole former H and through opening OF in the removable flange F and connecting the fastener to the connection 335'.

Although various embodiments have been described above, the details and features of the disclosed embodiments are not intended to be limiting, as many variations and modifications will be readily apparent to those of skill in the art. Accordingly, the scope of the present disclosure is intended to be interpreted broadly and to include all variations and modifications within the scope and spirit of the appended claims and their equivalents. For example, any feature described for one embodiment may be used in any other embodiment.

The invention claimed is:

1. A method of manufacturing a manhole component, comprising:
   creating a first mold having a void defining at least one channel extending from a first end to a second end;
   inserting a reinforcing structure into the first mold, said reinforcing structure including a plate with one or more lifting attachments, said plate positioned such that the at least one channel is positioned on one side of the plate and the one or more lifting attachments are positioned on an opposite side of the plate;
   pouring a polymer into the first mold;
   curing the polymer to create a second mold;
   attaching one or more hole formers to said second mold to create a modified second mold;
   using said one or more lifting attachments, positioning said modified second mold in a structure; and
   using said modified second mold, pouring a concrete manhole component.
2. The method of claim 1, wherein said one or more lifting attachments include one or more lifting eyes.

\* \* \* \* \*